United States Patent
Chung et al.

(10) Patent No.: US 8,913,090 B2
(45) Date of Patent: Dec. 16, 2014

(54) PIXEL CIRCUIT, ORGANIC ELECTRO-LUMINESCENT DISPLAY APPARATUS, AND METHOD OF DRIVING THE SAME

(75) Inventors: Bo-Yong Chung, Yongin (KR); Yong-Sung Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 493 days.

(21) Appl. No.: 12/889,329

(22) Filed: Sep. 23, 2010

(65) Prior Publication Data

US 2011/0164071 A1    Jul. 7, 2011

(30) Foreign Application Priority Data

Jan. 4, 2010 (KR) ......................... 10-2010-0000188

(51) Int. Cl.
G09G 5/10    (2006.01)
H05B 33/08    (2006.01)
G09G 3/32    (2006.01)

(52) U.S. Cl.
CPC ............ *G09G 3/3208* (2013.01); *G09G 3/3266* (2013.01); *G09G 2300/0852* (2013.01); *G09G 3/3233* (2013.01); *H05B 33/0896* (2013.01); *G09G 2300/0819* (2013.01); *G09G 2310/0262* (2013.01)
USPC ....................................................... 345/690

(58) Field of Classification Search
CPC ... G09G 3/3233; G09G 3/3241; G09G 3/325; G09G 3/3258; G09G 2300/0439–2300/0465
USPC ....................................................... 345/690
See application file for complete search history.

(56) References Cited

U.S. PATENT DOCUMENTS

| | | | |
|---|---|---|---|
| 7,916,102 B2* | 3/2011 | Chung et al. ..................... 345/82 |
| 2002/0030647 A1* | 3/2002 | Hack et al. ..................... 345/82 |
| 2008/0143653 A1* | 6/2008 | Shishido ......................... 345/78 |
| 2008/0224965 A1* | 9/2008 | Kim ................................ 345/76 |
| 2008/0309595 A1* | 12/2008 | Nitomi et al. ................... 345/76 |
| 2009/0027310 A1* | 1/2009 | Kim ................................ 345/76 |
| 2009/0108763 A1* | 4/2009 | Han et al. .................. 315/169.3 |
| 2009/0303220 A1* | 12/2009 | You et al. ....................... 345/211 |
| 2009/0309816 A1* | 12/2009 | Choi ............................... 345/76 |
| 2010/0001983 A1* | 1/2010 | Abe ............................... 345/211 |
| 2010/0164847 A1* | 7/2010 | Lee et al. ........................ 345/77 |
| 2010/0194716 A1* | 8/2010 | Park ............................... 345/204 |

(Continued)

FOREIGN PATENT DOCUMENTS

KR    10-2010-0045578    5/2010

OTHER PUBLICATIONS

KIPO Office Action dated May 11, 2011 for KR Application No. 10-2010-0000188 (6 pages).

*Primary Examiner* — Joe H Cheng
*Assistant Examiner* — Michael J Jansen, II
(74) *Attorney, Agent, or Firm* — Christie, Parker & Hale, LLP (57) ABSTRACT

A pixel circuit includes a light emitting device, an N-type driving transistor for outputting a driving current according to a voltage applied to the gate electrode, a first capacitor coupled to a gate electrode of the driving transistor, a second capacitor including a first terminal coupled to the gate electrode of the driving transistor and a second terminal coupled to the first electrode of the light emitting device, and second through sixth N-type transistors. An initialization period is reduced for a driving operation and the threshold voltage compensation time of a driving transistor is controlled.

21 Claims, 8 Drawing Sheets

(56) References Cited

U.S. PATENT DOCUMENTS

| | | | |
|---|---|---|---|
| 2010/0220038 A1* | 9/2010 | Chung et al. | 345/76 |
| 2010/0220040 A1* | 9/2010 | Kwak et al. | 345/76 |
| 2010/0245402 A1* | 9/2010 | Choi et al. | 345/690 |
| 2011/0115835 A1* | 5/2011 | Lee | 345/691 |
| 2011/0193850 A1* | 8/2011 | Chung et al. | 345/212 |
| 2011/0199357 A1* | 8/2011 | Chung et al. | 345/211 |

* cited by examiner

PIXEL CIRCUIT, ORGANIC ELECTRO-LUMINESCENT DISPLAY APPARATUS, AND METHOD OF DRIVING THE SAME

CROSS-REFERENCE TO RELATED APPLICATION

This application claims priority to and the benefit of Korean Patent Application No. 10-2010-0000188, filed on Jan. 4, 2010, in the Korean Intellectual Property Office, the disclosure of which is incorporated herein in its entirety by reference.

BACKGROUND

1. Field

Aspects of embodiments according to the present invention relate to a pixel circuit implemented using N-type transistors, an organic electro-luminescent display apparatus, and a method of driving the same.

2. Description of the Related Art

One type of flat panel display apparatuses is an organic electro-luminescent display which displays images by using organic light emitting diodes (OLEDs) that emit light by the recombination of electrons and holes. The organic electro-luminescent display apparatus has high response speed and low power consumption. The organic electro-luminescent display apparatus applies a data driving signal according to input data to a plurality of pixel circuits. The data driving signal controls the brightness of each pixel and thereby a corresponding image to a user is provided.

SUMMARY

Accordingly, an aspects of the present invention provides a sufficient initialization time and a sufficient threshold voltage compensation time for a driving transistor when implementing a pixel circuit and an organic electro-luminescent display apparatus by using N-type transistors.

According to an embodiment of the present invention, a pixel circuit includes: a light emitting device including a first electrode and a second electrode; a driving transistor including: a first electrode; a second electrode; and a gate electrode, the driving transistor for outputting a driving current according to a voltage applied to the gate electrode of the driving transistor; a first capacitor including a first terminal and a second terminal, the first capacitor being coupled to the gate electrode of the driving transistor; a second capacitor including a first terminal coupled to the gate electrode of the driving transistor and a second terminal coupled to the first electrode of the light emitting device; a second transistor including: a first electrode coupled to the gate electrode of the driving transistor; a second electrode coupled to the first electrode of the driving transistor; and a gate electrode; a third transistor for applying a first power supply voltage to the first electrode of the driving transistor in response to an emission control signal; a fourth transistor including a first electrode for receiving a data signal and a second electrode coupled to the first terminal of the first capacitor; a fifth transistor including: a first electrode for receiving a reference voltage; a second electrode coupled to the first terminal of the first capacitor; and a gate electrode; and a sixth transistor including: a first electrode for receiving a first voltage; a second electrode coupled to the gate electrode of the driving transistor; and a gate electrode, wherein the driving transistor and the second to sixth transistors are N-type transistors.

The sixth transistor may be configured to apply the first power supply voltage to the gate electrode of the driving transistor in response to a first scan signal applied to the gate electrode of the sixth transistor.

The fifth transistor may be configured to apply the reference voltage to the first terminal of the first capacitor in response to a second scan signal applied to the gate electrode of the fifth transistor, and the second transistor is configured to diode-connect the driving transistor in response to the second scan signal applied to the gate electrode of the second transistor.

The second scan signal may be a scan signal of an $n^{th}$ period.

The first scan signal and the second scan signal may both be maintained at a high signal level during an overlap period.

The second scan signal may be maintained at a high signal level for a duration greater than the overlap period.

The first scan signal may be a scan signal of an $(n-2)^{th}$ period.

The fourth transistor may transfer the data signal to the first terminal of the first capacitor in response to a third scan signal applied to the gate electrode of the fourth transistor.

The third scan signal may be a scan signal of an $(n+3)^{th}$ period.

The light emitting device may be an organic light emitting diode (OLED).

The driving transistor and the second to sixth transistors may be N-type metal-oxide semiconductor field effect transistors (MOSFETs).

The first electrode of the driving transistor may be a drain electrode and the second electrode of the driving transistor may be a source electrode.

The first voltage applied to the first electrode of the sixth transistor may be the first power supply voltage.

The first voltage applied to the first electrode of the sixth transistor may be an initial voltage.

The first voltage applied to the first electrode of the sixth transistor may be the reference voltage.

According to another embodiment of the present invention, a method of driving a pixel circuit including an organic light emitting diode (OLED), a driving transistor, a plurality of switching transistors configured to turned on in response to first to third scan signals and an emission control signal, a plurality of storage capacitors, and a boosting capacitor coupled between first electrodes of boosting transistors, wherein the driving transistor, the switching transistors, and the boosting transistors are NMOS transistors, the method including: initializing the pixel circuit when the first scan signal has a high signal level; diode-connecting the driving transistor to compensate for a threshold voltage of the driving transistor when the second scan signal has the high signal level; writing a data signal in the pixel circuit when the third scan signal has the high signal level; and flowing a current through the OLED to emit light in response to the written data signal when the emission control signal has the high signal level.

The first scan signal and the second scan signal may both be maintained at a high signal level during an overlap period.

The second scan signal may be maintained at a high signal level for a duration greater than the overlap period.

According to another embodiment of the present invention, an organic electro-luminescent display apparatus including: a scan driver for supplying a scan signal to a plurality of scan lines; an emission control driver for supplying an emission control signal to a plurality of emission control lines; a data driver for supplying a data signal to a plurality of data lines; and a plurality of pixel circuits located at crossing regions of the scan lines, the emission control lines and the data lines, wherein each pixel circuit of the plurality of pixel circuits includes: an organic light emitting diode (OLED) including a first electrode and a second electrode; a driving transistor including: a first electrode; a second electrode; and a gate electrode, the driving transistor for outputting a driving current according to a voltage applied to the gate electrode of the driving transistor; a first capacitor including a first terminal and a second terminal coupled to the gate electrode of the driving transistor; a second capacitor including a first terminal coupled to the gate electrode of the driving transistor and a second terminal coupled to the first electrode of the OLED; a second transistor including: a first electrode coupled to the gate electrode of the driving transistor; a second electrode coupled to the first electrode of the driving transistor; and a gate electrode; a third transistor for applying a first power supply voltage to the first electrode of the driving transistor in response to the emission control signal; a fourth transistor including: a first electrode coupled to the data signal, a second electrode coupled to the first terminal of the first capacitor; and a gate electrode; a fifth transistor including: a first electrode coupled to a reference voltage; a second electrode coupled to the first terminal of the first capacitor; and a gate electrode; and a sixth transistor including: a first electrode coupled to the first power supply voltage; a second electrode coupled to the gate electrode of the driving transistor; and a gate electrode, wherein the driving transistor and the second to sixth transistors are N-type transistors.

The gate electrode of the sixth transistor may be coupled to an $(n-2)^{th}$ scan line of the scan lines and may be configured to apply the first power supply voltage to the gate electrode of the driving transistor in response to the scan signal applied to the gate electrode of the sixth transistor.

The gate electrode of the fifth transistor may be coupled to an $n^{th}$ scan line of the scan lines and may be configured to apply the reference voltage to the first terminal of the first capacitor in response to the scan signal applied to the gate electrode of the fifth transistor.

The gate electrode of the second transistor may be coupled to a $n^{th}$ scan line of the scan lines and may be configured to diode-connect the driving transistor in response to the scan signal applied to the gate electrode of the second transistor.

The gate electrode of the fourth transistor may be coupled to an $(n+3)^{th}$ scan line of the scan lines and may be configured to transfer the data signal to the first terminal of the first capacitor in response to the scan signal applied to the gate electrode of the fourth transistor.

BRIEF DESCRIPTION OF THE DRAWINGS

The above and other features and aspects will become more apparent by describing in detail exemplary embodiments thereof with reference to the attached drawings in which.

DETAILED DESCRIPTION

Exemplary embodiments of the present invention will now be described more fully with reference to the accompanying drawings. Like reference numerals in the drawings denote like elements, and thus any redundant description will be omitted for conciseness.

In general, an organic electro-luminescent display apparatus emits light by electrically exciting a fluorescent organic compound, and displays an image by driving a plurality of pixels arranged in a matrix configuration. An organic light emitting device included in the pixel is referred to as an organic light emitting diode (OLED) because it has diode characteristics.

Figure 1:
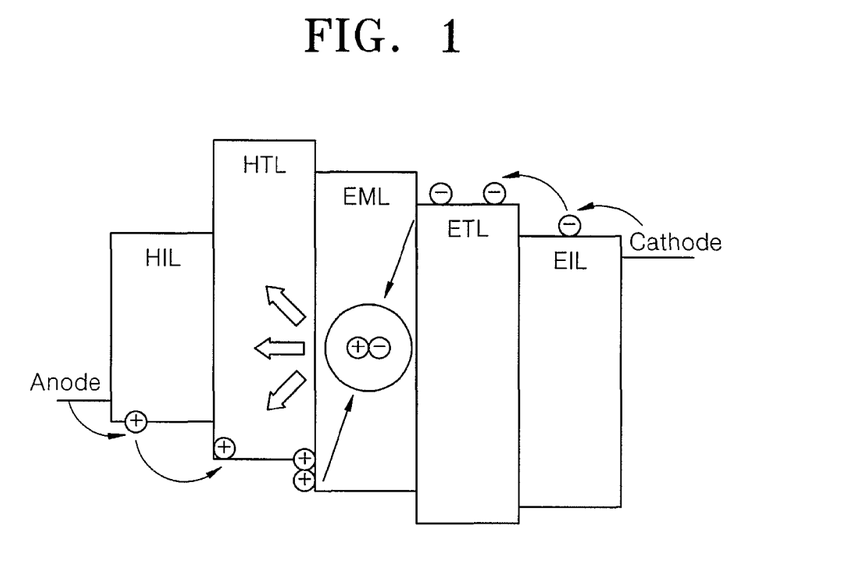
FIG. 1 illustrates a structure of an organic light emitting diode (OLED)

FIG. 1 illustrates a structure of an organic light emitting diode (OLED).

Referring to FIG. 1, an OLED has a stack structure of an anode electrode layer Anode formed of an indium tin oxide (ITO), an organic thin film, and a cathode electrode layer Cathode formed of a metal. The organic thin film includes an emitting layer EML, an electron transport layer ETL, and a hole transport layer HTL in order to improve the balance of electrons and holes to enhance the light emitting efficiency. The organic thin film may further include a hole injecting layer HIL or an electron injecting layer EIL.

A thin film transistor may be coupled to an anode electrode of the OLED, and the OLED may be driven according to a data voltage sustained by the capacitance of a capacitor coupled to a gate electrode of the thin film transistor.

Figure 2:
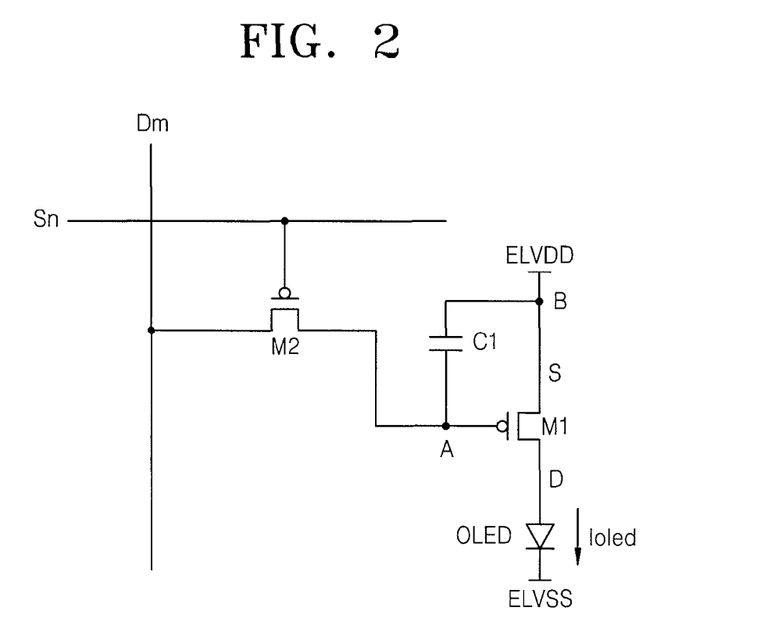
FIG. 2 illustrates an exemplary pixel circuit implemented using P-type transistors.

FIG. 2 illustrates an exemplary pixel circuit implemented using P-type transistors.

Referring to FIG. 2, a switching transistor M2 is turned on by a select signal of a select scan line Sn, a data voltage is transferred from a data line Dm to a gate terminal of a driving transistor M1, and a potential difference between the data voltage and a voltage of a first power supply voltage source ELVDD is stored in a capacitor C1 which is coupled between a source electrode of the driving transistor M1 and the gate terminal of the driving transistor M1. Due to the potential difference, a driving current Ioled flows through an OLED to cause the OLED to emit light. Herein, a gray level (may also be referred to as a gray scale or a gray scale level) may be displayed according to the level of the data voltage applied.

However, the driving transistors M1 of pixel circuits may have different threshold voltages. If the driving transistors M1 of the pixel circuits have different threshold voltages, then the output current levels of the driving transistors M1 of the pixel circuits become different, thus making it very difficult to implement a uniform image quality. Such a threshold voltage difference between the driving transistors M1 may increase with an increase in the size of an organic electro-luminescent display apparatus, which may degrade the image quality of the organic electro-luminescent display apparatus. Thus, the threshold voltage of the driving transistor M1 in each pixel circuit of the organic electro-luminescent display apparatus should be compensated to provide a uniform image quality.

In the pixel circuit of FIG. 2, the switching transistor M2 and the driving transistor M1 are configured using PMOS transistors, one terminal of the capacitor C1 is coupled to the first power supply voltage source ELVDD, and the other terminal of the capacitor C1 is coupled to a node A. One electrode of the switching transistor M2 and the gate electrode of the driving transistor M1 are also coupled to the node A. The source electrode of the driving transistor M1 is coupled to the first power supply voltage source ELVDD, and a drain electrode of the driving transistor M1 is coupled to an anode electrode of the OLED.

In this case, the driving transistor M1 acts as a current source, the gate electrode of the driving transistor M1 receives the data voltage, and the source electrode of the driving transistor M1 receives the voltage from the first power supply voltage source ELVDD. That is, because the source electrode of the driving transistor M1 is always fixed at the voltage of the first power supply voltage source ELVDD, the emission voltage of the OLED does not affect a gate-source voltage Vgs of the driving transistor M1.

If the switching transistor M2 and the driving transistor M1 of FIG. 2 were configured using N-type transistors, the capacitor C1 would be coupled between the gate electrode of the driving transistor M1 and the drain electrode of the driving transistor M1.

In this case, the source electrode of the driving transistor M1 would not be fixed at the voltage of the first power supply voltage source ELVDD, which would become a source follower coupled to a load. Thus, the gate-source voltage Vgs of the driving transistor M1 would be affected by a cathode power voltage ELVSS of the OLED and the emission voltage of the OLED.

The level of the voltage from the cathode power supply voltage source ELVSS varies due to an IR voltage drop caused by the parasitic resistance of an interconnection transferring the cathode power supply voltage source ELVSS from a power supply and a voltage drop caused by a current flowing into each pixel. Accordingly, the voltage of the source electrode in such a pixel circuit implemented using N-type transistors would become unstable, which may destabilize the image brightness.

Also, the emission voltage of the OLED in the pixel circuit implemented using N-type transistors would affects the gate-source voltage Vgs of the driving transistor M1. Thus, it would become sensitive to the variation/degradation-dependent change and the temperature-dependent characteristics of the OLED.

Figure 3:
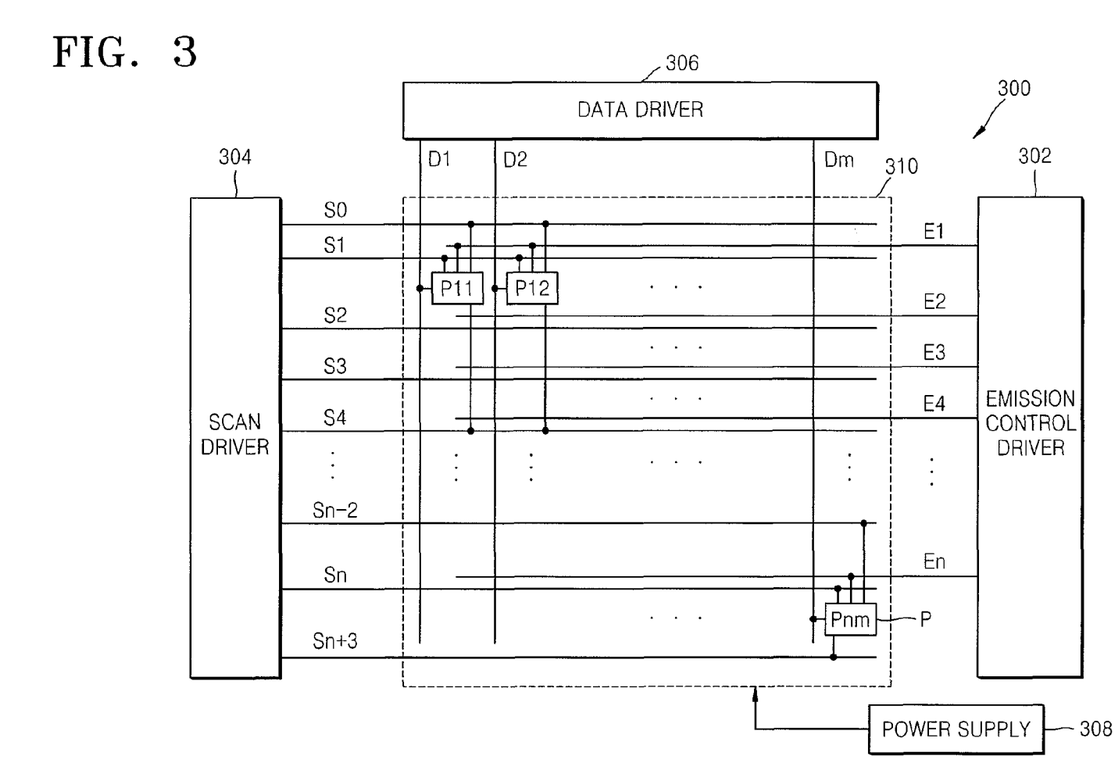
FIG. 3 illustrates an organic electro-luminescent display apparatus according to an embodiment of the present invention.

FIG. 3 illustrates an organic electro-luminescent display apparatus 300 according to an embodiment of the present invention.

Referring to FIG. 3, an organic electro-luminescent display apparatus 300 according to an embodiment of the present invention includes a display unit 310, an emission control driver 302, a scan driver 304, a data driver 306, and a power supply 308.

The emission control driver 302, the scan driver 304, the data driver 306 and the power supply 308 may be implemented in one IC chip.

The display unit 310 includes (n×m) pixel circuits P (P11, P12, ..., Pnm) each having an OLED (not illustrated), (n+3) scan lines extending in the row direction to transfer scan signals S0, S1, S2, ..., Sn+3, m data lines extending in the column direction to transfer data signals D1, D2, ..., Dm, and n emission control lines extending in the row direction to transfer emission control signals E1, E2, ..., En.

Each of the pixel circuits P receives the scan signal, the data signal, the emission control signal, a voltage from a first power supply voltage source ELVDD, a voltage from a second power supply voltage source ELVSS, a reference voltage from a reference voltage source Vref and an initial voltage Vinit to cause their respective OLEDs to emit light and thereby display an image.

The emission control driver 302 is coupled to the emission control lines to apply the emission control signals E1, E2, ..., En to the display unit 310. The scan driver 304 is coupled to the scan lines to apply the scan signals S0, S1, S2, ..., Sn+3 to the display unit 310. The data driver 306 is coupled to the data lines to apply the data signals D1, D2, ..., Dm to the display unit 310. Herein, the data driver 306 supplies a data current to the pixel circuits P during a programming period. The power supply 308 supplies the voltage of first power supply voltage source ELVDD, a voltage of the second power supply voltage source ELVSS, a voltage of the reference voltage source Vref, and the initial voltage Vinit to each of the pixel circuits P.

Figure 4:
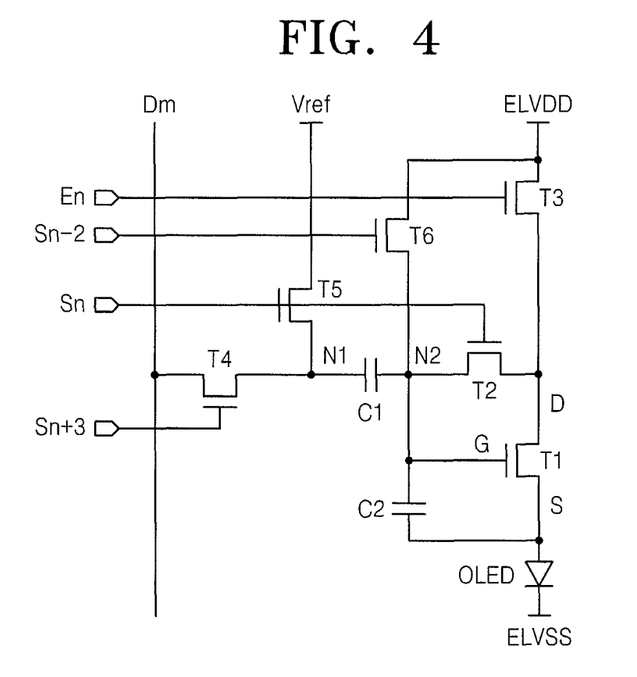
FIG. 4 is a circuit diagram illustrating an embodiment of a pixel circuit as illustrated in FIG. 3 according to an embodiment of the present invention.

FIG. 4 is a circuit diagram illustrating an embodiment of the pixel circuit as shown in FIG. 3.

FIG. 4 illustrates the pixel circuit Pnm located at the $n^{th}$ row and $m^{th}$ column. The pixel circuit Pnm receives the data signal Dm from the data driver 306 through the corresponding data line and outputs a driving current corresponding to the data signal Dm. Also, the pixel circuit Pnm is coupled to the $(n-2)^{th}$, $n^{th}$ and $(n+3)^{th}$ scan lines to receive the scan signals.

The pixel circuit Pnm according to an embodiment of the present invention includes a driving transistor T1, second to sixth transistors T2, T3, T4, T5 and T6, a light emitting device, a first capacitor C1, and a second capacitor C2.

The light emitting device may be an OLED that has a similar (or the same) structure as illustrated FIG. 1. The OLED has a first electrode corresponding to an anode electrode and a second electrode corresponding to a cathode electrode. According to an embodiment of the present invention, the OLED has an anode electrode coupled to a source electrode of the driving transistor T1 and a cathode electrode coupled to the second power supply voltage source ELVSS.

The first capacitor C1 has a first terminal coupled to a first node N1 and a second terminal coupled at a second node N2 to a gate electrode of the driving transistor T1.

The second capacitor C2 has a first terminal coupled to the second node N2 and a second terminal coupled to the source electrode of the driving transistor T1.

The driving transistor T1 and the second to sixth transistors T2, T3, T4, T5 and T6 of the pixel circuit Pnm may be N-type transistors such as N-type metal-oxide semiconductor field effect transistors (MOSFETs). The N-type transistor is turned on/off according to whether a high or low signal level is applied to its gate electrode. An oxide or amorphous-silicon (amorphous-Si) transistor can be implemented at a lower cost than a poly-silicon (poly-Si) transistor. However, in a display panel using an oxide or amorphous-Si transistor as a backbone, a pixel circuit should be implemented using only N-type transistors capable of compensating for the device characteristic distribution. Thus, an embodiment of the present invention provides a pixel circuit that is configured using only N-type transistors.

The driving transistor T1 has a first electrode D corresponding to a drain electrode and a second electrode S corresponding to a source electrode and outputs a driving current according to a voltage applied to its gate electrode.

The second transistor T2 has a first electrode coupled to the gate electrode of the driving transistor T1 (e.g., at the second node N2) and a second electrode coupled to the drain electrode D of the driving transistor T1. The second transistor T2 diode-connects the driving transistor T1 in response to the scan signal Sn of the $n^{th}$ scan line applied to its gate electrode.

The third transistor T3 has a first electrode coupled to the first power supply voltage source ELVDD and a second electrode coupled to the drain electrode D of the driving transistor T1. The third transistor T3 applies the voltage from the first power supply voltage source ELVDD to the drain electrode D of the driving transistor T1 in response to the emission control signal En.

The fourth transistor T4 has a first electrode coupled to the data line for applying the data signal Dm and a second electrode coupled to the first node N1. Herein, the first terminal of the first capacitor C1 is coupled to the first node N1. The fourth transistor T4 applies the data signal Dm to the first node N1 in response to the scan signal Sn+3 of the $(n+3)^{th}$ scan line.

The fifth transistor T5 has a first electrode coupled to the reference voltage source Vref and a second electrode coupled to the first node N1. The fifth transistor T5 applies the voltage from the reference voltage source Vref to the first node N1 in response to the scan signal Sn of the $n^{th}$ scan line.

The sixth transistor T6 has a first electrode coupled to the first power supply voltage source ELVDD and a second electrode coupled to the gate electrode of the driving transistor T1. The second electrode of the sixth transistor T6, the gate electrode of the driving transistor T1, the second terminal of the first capacitor C1, and the first terminal of the second capacitor C2 are coupled to the second node N2. The sixth transistor T6 applies the voltage from the first power supply voltage source ELVDD to the second node N2 in response to the scan signal Sn-2 of the $(n-2)^{th}$ scan line.

According to other embodiments of the present invention, the voltage of the reference voltage source Vref or the initial voltage Vinit may be applied to the first electrode of the sixth transistor T6 instead of the voltage from the first power supply voltage source ELVDD.

Figure 5:
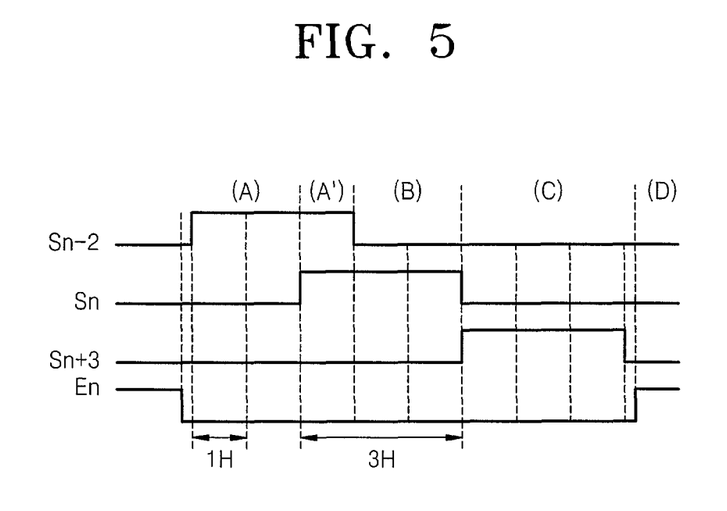
FIG. 5 is a timing diagram of driving signals according to an embodiment of the present invention.

FIG. 5 is a timing diagram of driving signals according to an embodiment of the present invention. FIGS. 6 to 10 illustrate an operation process of the pixel circuit of FIG. 4 according to the timing diagram shown in FIG. 5.

Referring to FIG. 5, an initialization operation is performed during a period (A). According to an embodiment of the present invention, the scan signal Sn-2 (i.e., an initialization signal) of the $(n-2)^{th}$ scan line is used to provide divided initialization periods. A load on an initialization time increases as the size of the organic electro-luminescent apparatus increases. Therefore, if the initialization and the compensation of the threshold voltage of the transistor are performed concurrently (e.g., simultaneously or substantially simultaneously), then the time necessary for the initialization may be decreased substantially. Thus, an embodiment of the present invention divides the initialization and allows for a decrease in the initialization time.

During the period (A), the scan signal Sn-2 of the $(n-2)^{th}$ scan line is asserted at a high signal level, and the scan signal Sn of the $n^{th}$ scan line, the scan signal Sn+3 of the $(n+3)^{th}$ scan line, and the emission control signal En are asserted at a low signal level. Accordingly, the sixth transistor T6 is turned on and the driving transistor T1 and the second to fifth transistors T2, T3 T4 and T5 are turned off.

Figure 6:
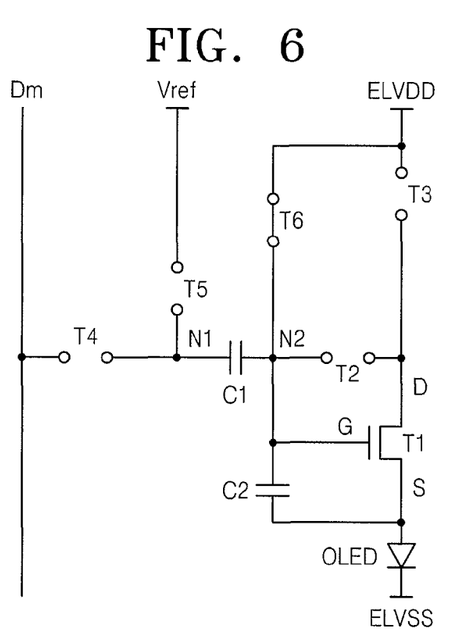
FIGS. 6 to 10 illustrate an operation process of a pixel circuit of FIG. 4 according to the timing diagram shown in FIG. 5.

FIG. 6 illustrates an operation of the pixel circuit in the period (A).

During the period (A), the sixth transistor T6 is turned on to initialize the voltage of the second node N2 (i.e., the second terminal of the first capacitor C1 and the gate electrode of the driving transistor T1) to the voltage of the first power supply voltage source ELVDD. During the period (A), the voltage level of the second node N2 is ELVDD and the voltage level of the anode electrode of the OLED is equal to the sum (ELVSS+Vto) of the voltage of the second power supply voltage source ELVSS and a threshold voltage Vto of the OLED.

During a period (A'), the scan signal Sn-2 of the $(n-2)^{th}$ scan line maintains the high signal level, the scan signal Sn+3 of the $(n+3)^{th}$ scan line and the emission control signal En both maintain the low signal level, and the scan signal Sn of the $n^{th}$ scan line changes to the high signal level. Thus, during the high-level overlap period (A'), the scan signal Sn-2 of the $(n-2)^{th}$ scan line and the scan signal Sn of the $n^{th}$ scan line both have a high signal level asserted. Accordingly, the second transistor T2, the fifth transistor T5 and the sixth transistor T6 are turned on, and the driving transistor T1, the third transistor T3 and the fourth transistor T4 are turned off.

Figure 7:
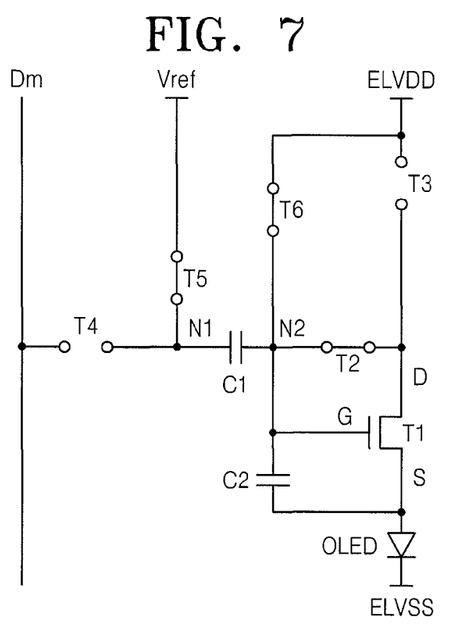

FIG. 7 illustrates an operation of the pixel circuit in the period (A').

During the period (A'), the initialization and the compensation of a threshold voltage Vth of the driving transistor T1 are performed. The fifth transistor T5 is turned on to initialize the first node N1 to the voltage level of the reference voltage source Vref. That is, the first terminal of the first capacitor C1 is initialized to the voltage level of the reference voltage source Vref. Also, because the sixth transistor T6 is still turned on, the second terminal of the first capacitor C1 is initialized to the voltage level of the first power supply voltage source ELVDD.

According to an embodiment of the present invention, an overlap period (A') occurs in which both the scan signal Sn-2 of the $(n-2)^{th}$ scan line and the scan signal Sn of the $n^{th}$ scan line are asserted at the high-level, thus allowing for a more stable initialization of the first capacitor C1. In the period (A'), when the second terminal of the first capacitor C1 is initialized to the voltage level of the first power supply voltage source ELVDD, the first terminal of the first capacitor C1 is in a floating state. Thus, if the second terminal of the first capacitor C1 is not fixed and the scan signal Sn of the $n^{th}$ scan line applies the reference voltage source Vref to the first terminal of the first capacitor C1, the voltage stored in the first capacitor C1 is affected. Thus, the overlap period (A') is provided to prevent the floating state of the first and second terminals of the first capacitor C1, thus making it possible to stably initialize the first capacitor C1.

Also, during the period (A'), the driving transistor T1 is diode-connected to compensate for the threshold voltage of the driving transistor T1. That is, the driving transistor T1 is diode-connected by the second transistor T2 in order to apply the threshold voltage Vth of the driving transistor T1 between the first and second electrodes of the second transistor T2.

During a period (B), the scan signal Sn of the $n^{th}$ scan line maintains the high signal level, the scan signal Sn-2 of the $(n-2)^{th}$ scan line changes to the low signal level, and the scan signal Sn+2 of the $(n+3)^{th}$ scan line and the emission control signal En maintain the low signal level. Accordingly, the second and fifth transistors T2 and T5 are turned on and the third, fourth and sixth transistors T3, T4 and T6 are turned off.

Figure 8:
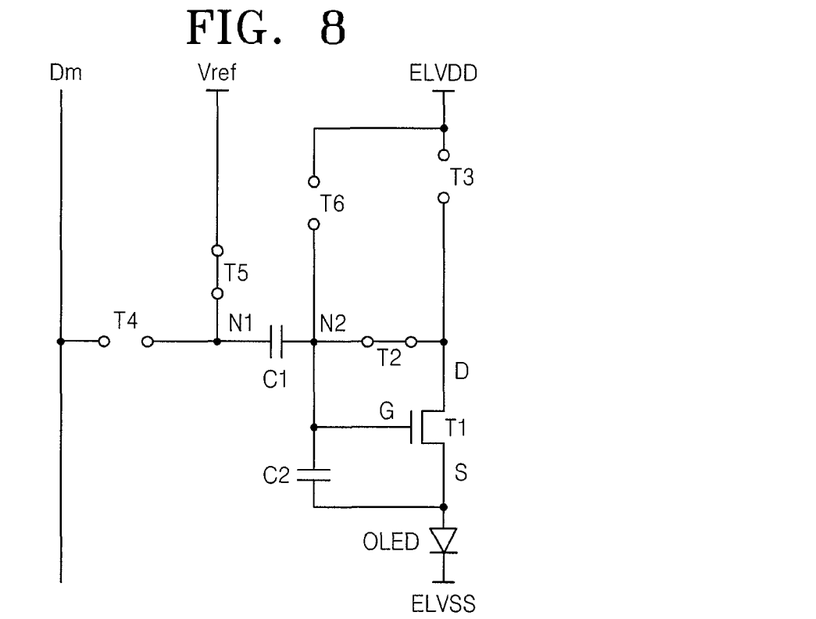

FIG. 8 illustrates an operation of the pixel circuit in the period (B).

During the period (B), the threshold voltage Vth of the driving transistor T1 is compensated. That is, the driving transistor T1 is diode-connected by the second transistor T2 to compensate for the threshold voltage Vth of the driving transistor T1. During the period (B), the voltage of the first node N1 is the reference voltage source Vref, the voltage of the second node N2 is the compensated threshold voltage ELVSS+Vto+Vth, and the voltage of the anode electrode of the OLED is the sum (ELVSS+Vto) of the second power supply voltage source ELVSS and the threshold voltage Vto of the OLED.

According to the embodiment illustrated in FIG. 5, the high-level period of the scan signal Sn of the $n^{th}$ scan line for compensating the threshold voltage Vth of the driving transistor T1 may be a duration of 3H. Herein, a duration 1H corresponds to 1 row line time (e.g., 1 horizontal line time) and 3H corresponds to a duration which is three times longer than 1 H. According to other embodiments of the present invention, the period for compensating the threshold voltage Vth of the driving transistor T1 may increase as needed (e.g., from 3H to 4H or 5H.) If images are displayed through a high-speed driving operation in a large-size display panel, the duration 1H may decrease. In this case, a sufficient threshold voltage compensation time cannot be secured. Thus, embodiments of the present invention increase the threshold voltage compensation time corresponding to the period (B), thereby making it possible to secure the threshold voltage compensation time when performing a high-speed driving operation in a large-size display panel.

During a period (C), the scan signal Sn+3 of the $(n+3)^{th}$ scan line changes to the high signal level, the scan signal Sn of the $n^{th}$ scan line changes to the low signal level, and the scan signal Sn−2 of the $(n−2)^{th}$ scan line and the emission control signal En maintain the low signal level. Accordingly, the fourth transistor T4 is turned on and the second, third, fifth and sixth transistors T2, T3, T5 and T6 are turned off.

Figure 9:
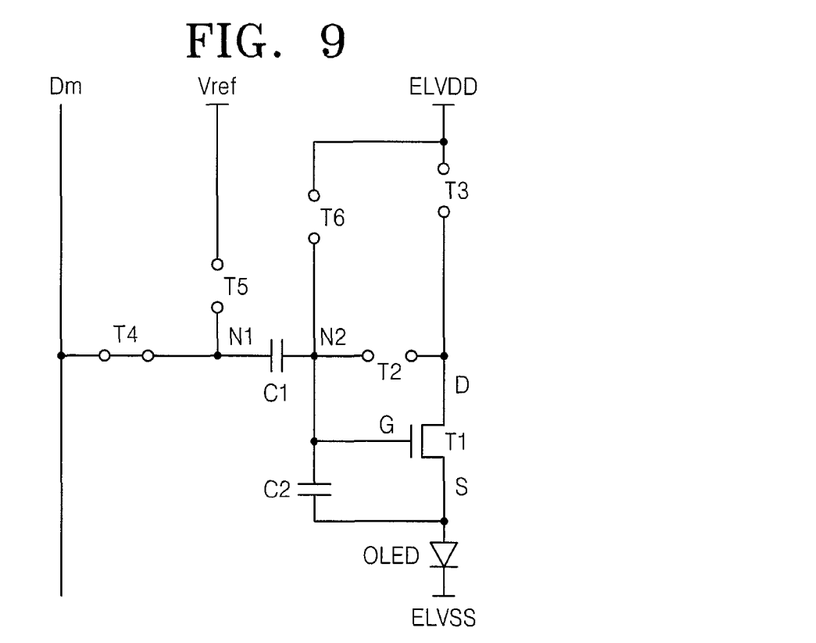

FIG. 9 illustrates an operation of the pixel circuit in the period (C).

During the period (C), data can be written. The fourth transistor T4 is turned on to apply the data signal Dm of the current frame, so that the voltage of the first node N1 would become a data voltage Vdata. As the voltage of the first node N1 changes from Vref to Vdata, the voltage of the second node N2 changes by the voltage variation (Vdata−Vref) of the first node N1 through the first capacitor C1. That is, the voltage of the second node N2 changes to (ELVSS+Vto+Vth)+(ΔV1). Herein, ΔV1 corresponds to the difference (Vdata−Vref) between the data voltage Vdata and the voltage of the reference voltage source Vref.

During period (C), the scan signal Sn+3 of the $(n+3)^{th}$ scan line changes from the high signal level to the low signal level, just prior to the start of a period (D).

During the period (D), the emission control signal En changes to the high signal level, and the scan signal Sn−2 of the $(n−2)^{th}$ scan line, the scan signal Sn of the $n^{th}$ scan line, and the scan signal Sn+3 of the $(n+3)^{th}$ scan line maintain the low signal level. Accordingly, the third transistor T3 is turned on and the second, fourth, fifth and sixth transistors T2, T4, T5 and T6 are turned off.

Figure 10:
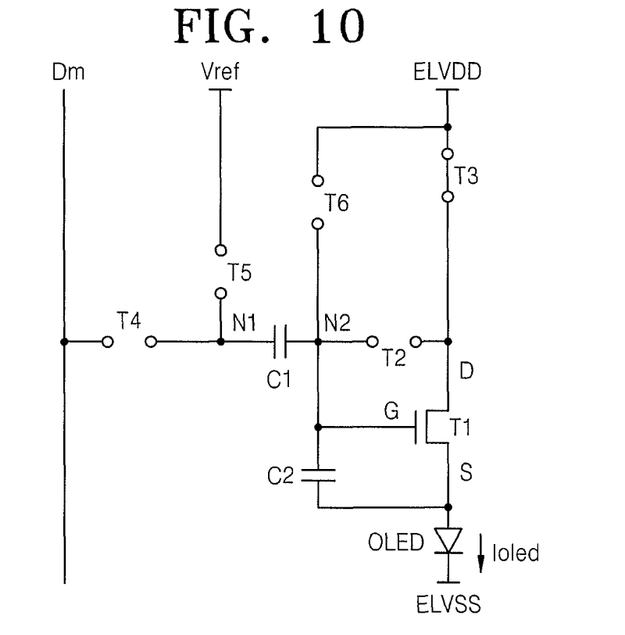

FIG. 10 illustrates an operation of the pixel circuit in the period (D).

During the period (D), a current flows through the OLED to cause the OLED to emit light. During the period (D), because a driving current according to the voltage level corresponding to the difference between the source voltage and the gate voltage of the driving transistor T1 is generated by the driving transistor T1 and the fourth transistor T4 is turned on, an OLED driving current flows through the driving transistor T1 and the OLED. The voltage of the source electrode of the driving transistor T1 is equal to the voltage of the anode electrode of the OLED, and the voltage of the anode electrode of the OLED is ELVSS+Voled. Herein, Voled is the voltage applied across the OLED when the OLED emits light.

The gate voltage of the driving transistor T1 is described below. First, as the voltage of the anode electrode of the OLED changes from (ELVSS+Vto) to (ELVSS+Voled) by the light emission of the OLED, the voltage of the second node N2 (i.e., a gate voltage Vg of the driving transistor T1) changes by the voltage variation (Voled−Vto) of the anode electrode of the OLED through the second capacitor C2. Thus, the gate voltage Vg of the driving transistor T1 changes as Equation (1).

$$Vg=(Vdata-Vref)+(ELVSS+Vto+Vth)+(Voled-Vto) \quad (1)$$

Therefore, the gate-source voltage Vgs of the driving transistor T1 during the period (D) is expressed as Equation (2).

$$Vgs=\{(Vdata-Vref)+(ELVSS+Vto+Vth)+(Voled-Vto)\}-(ELVSS+Voled) \quad (2)$$

The driving current Ioled is determined by the gate-source voltage Vgs as Equations (3) and (4). In Equations (3) and (4), k=β/2, k is a constant, and β is a gain factor.

$$Ioled = k\left[\left\{\begin{array}{l}(Vdata - Vref) + (ELVSS + Vto + Vth) + \\ (Voled - Vto) - (ELVSS + Voled)\end{array}\right\} - Vth\right]^2 \quad (3)$$

$$= k[(Vdata - Vref + Vth) - Vth]^2$$

$$Ioled = k(Vdata - Vref)^2 \quad (4)$$

Thus, the driving current Ioled outputted from the pixel circuit according to an embodiment of the present invention is determined independently of the voltage of the first power supply voltage source ELVDD, the voltage of the second power supply voltage source ELVSS, and the threshold voltage Vth of the driving voltage Vth. That is, because a gray level is implemented according to the difference between Vdata and Vref as in Equation (4), a current flows independently of the voltage of the second power supply voltage source ELVSS, thereby making it possible to prevent the degradation of the image quality due to an IR drop. Also, it is possible to display an uniformly bright image independently of the threshold voltage Vth of the transistor. Also, embodiments of the present invention divide the scan signal Sn−2 of the $(n−2)^{th}$ scan line by the initialization signal, thereby securing a sufficient initialization time in a large-size organic electro-luminescent display apparatus and thereby improving the contrast ratio.

It can be seen from Equation (4) that the difference between the voltage level of the reference voltage source Vref and the data voltage Vdata is important for a gray level. For example, if the data voltage Vdata is about 0~5V, the voltage of the reference voltage source Vref may be about 2V. In this case, a black-gradation data voltage Vdata_black is about 0V (or less than about 2V) and a white-gradation data voltage Vdata_white is about 5V. That is, (Vdata_black(0V)=Vref (2V)<Vdata_white (5V).

Figure 11:
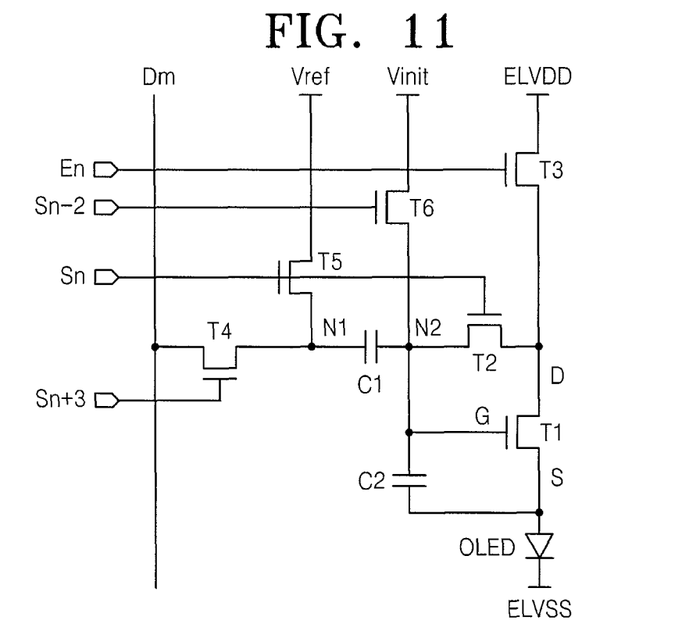
FIGS. 11 and 12 illustrate a structure of a pixel circuit according to another embodiment of the present invention.

FIG. 11 illustrates a structure of a pixel circuit according to another embodiment of the present invention.

Referring to FIG. 11, the first electrode of the sixth transistor T6 is coupled to the initial voltage Vinit. Accordingly, during the initialization period, the sixth transistor T6 applies the initial voltage Vinit to the second terminal of the first capacitor C1 (the gate electrode of the driving transistor T1) in response to the scan signal Sn−2 of the $(n−2)^{th}$ scan line. Herein, the initial voltage Vinit is greater than the sum (ELVSS+Vto+Vth) of the second power supply voltage source ELVSS, the threshold voltage Vto of the OLED, and the threshold voltage Vth of the driving transistor T1 (i.e., Vinit=ELVSS+Vto+Vth).

Figure 12:
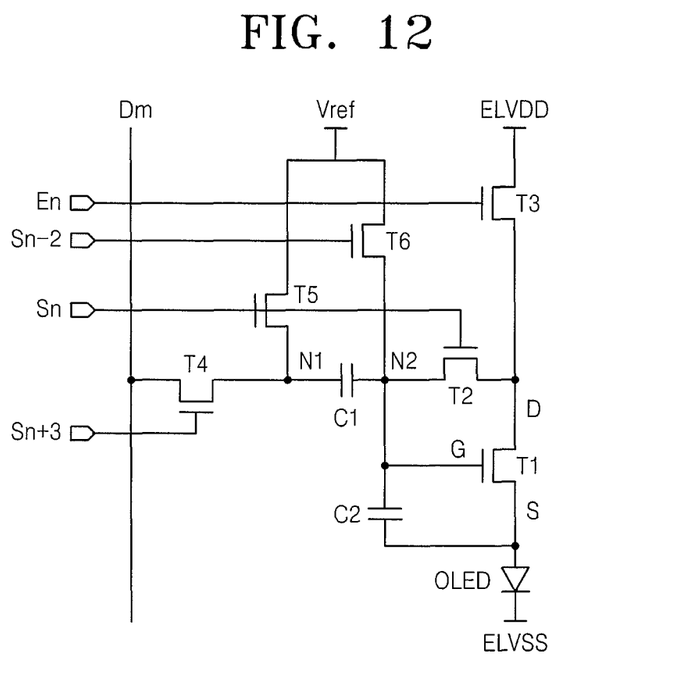

FIG. 12 illustrates a structure of a pixel circuit according to another embodiment of the present invention.

Referring to FIG. 12, the first electrode of the sixth transistor T6 is coupled to the reference voltage source Vref. Accordingly, during the initialization period, the sixth transistor T6 applies the voltage of the reference voltage source Vref to the second terminal of the first capacitor C1 (the gate electrode of the driving transistor T1) in response to the scan signal Sn−2 of the (n−2)$^{th}$ scan line. The embodiment illustrated in FIG. 12 reduces the number of interconnections relative to the embodiment illustrated in FIG. 11.

Figure 13:
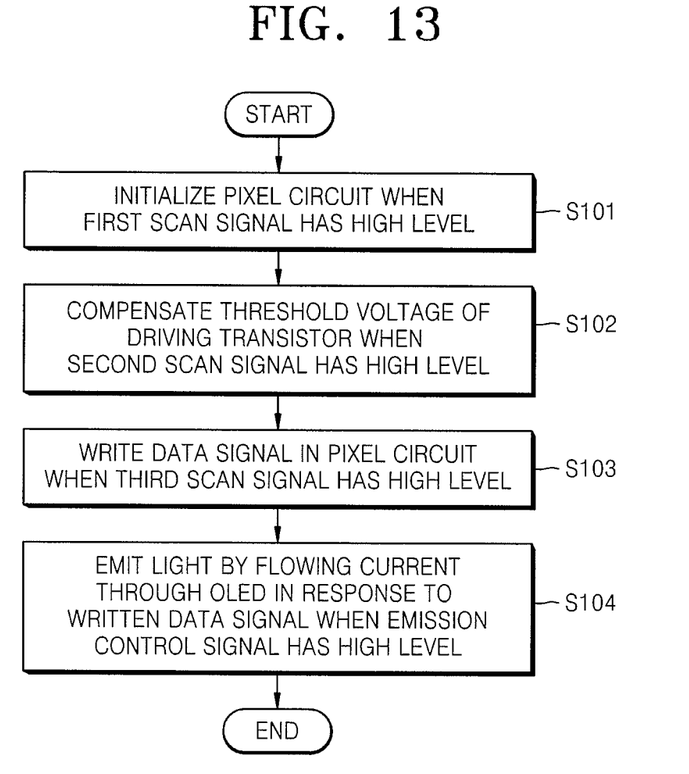
FIG. 13 is a flow chart illustrating a method of driving an organic electro-luminescent display apparatus according to an embodiment of the present invention.

FIG. 13 is a flow chart illustrating a method of driving an organic electro-luminescent display apparatus according to an embodiment of the present invention.

Referring to FIG. 13, a first scan signal corresponds to the scan signal Sn−2 of the (n−2)$^{th}$ scan line, a second scan signal corresponds to the scan signal Sn of the n$^{th}$ scan line and a third scan signal corresponds to the scan signal Sn+3 of the (n+3)$^{th}$ scan line.

Operation S101 is an initialization period. When the first scan signal Sn−2 (i.e., the initialization signal) has a high signal level, the sixth transistor T6 is turned on to initialize the second node N2 to which the second terminal of the first capacitor C1 and the gate electrode of the driving transistor T1 are coupled. Herein, the initialization voltage of the second node N2 may be the voltage level of the first power supply voltage source ELVDD, the initial voltage Vinit, or the voltage level of the reference voltage source Vref according to the voltage source coupled to the first electrode of the driving transistor T6.

Operation S102 is a threshold voltage compensation period. When the second scan signal Sn has a high signal level, the second transistor T2 is turned on to diode-connect the driving transistor T1.

The initialization period of operation S101 and the threshold voltage compensation period of operation S102 may partially overlap with each other. In operation S102, the fifth transistor T5 is turned on to fix the voltage of the first node N1 to the voltage level of the reference voltage source Vref. If it is performed concurrently (e.g., simultaneously) with the initialization of the second node N2 in operation S101, then the first capacitor C1 can be stably initialized without becoming a floating state. Also, the period of operation S102 may increase if necessary for a high-speed driving operation of a large-size display panel. Accordingly, a sufficient threshold voltage compensation period can be secured.

Operation S103 is a data write period. When the third scan signal Sn+3 has the high signal level, the data voltage Vdata is applied to the first node N1 and the voltage corresponding to the data voltage Vdata is stored in the first capacitor C1.

Operation S104 is an OLED light emission period. When the emission control signal has the high signal level, the driving current Ioled is outputted to the anode electrode of the OLED. As expressed in Equation (4), the level of the driving current Ioled is determined according to the voltage level Vdata of the data signal Dm stored in the first capacitor C1. The OLED emits light, the brightness of which corresponds to the level of the driving current Ioled.

According to the embodiments of the present invention, the driving current outputted from the OLED can be determined independently of the threshold voltage of the driving transistor and the cathode power supply voltage of the OLED. Accordingly, it is possible to eliminate the threshold voltage variation of the driving transistor and the IR drop caused by a parasitic resistance of the interconnection transferring the cathode power supply voltage of the OLED. Additionally, the contrast ratio in the large-size display panel can be improved by dividing the initialization period, and a suitable high-speed driving operation is provided by controlling the compensation time of the threshold voltage.

While exemplary embodiments of the present invention have been particularly shown and described, it will be understood by those of ordinary skill in the art that various changes in form and details may be made therein without departing from the spirit and scope of the present invention as defined by the following claims.

What is claimed is:

1. A pixel circuit comprising:
a light emitting device comprising a first electrode and a second electrode;
a driving transistor comprising: a first electrode; a second electrode; and a gate electrode, the driving transistor for outputting a driving current according to a voltage applied to the gate electrode of the driving transistor;
a first capacitor comprising a first terminal and a second terminal, the second terminal of the first capacitor being coupled to the gate electrode of the driving transistor;
a second capacitor comprising a first terminal coupled to the gate electrode of the driving transistor and a second terminal directly coupled to the first electrode of the light emitting device, the second capacitor being different from the first capacitor;
a second transistor comprising: a first electrode coupled to the gate electrode of the driving transistor; a second electrode coupled to the first electrode of the driving transistor; and a gate electrode, wherein the second transistor is configured to be turned on in response to a second scan signal applied to the gate electrode;
a third transistor for applying a first power supply voltage to the first electrode of the driving transistor in response to an emission control signal, the third transistor comprising a first electrode directly connected to a first power supply voltage line;
a fourth transistor comprising a first electrode for receiving a data signal and a second electrode coupled to the first terminal of the first capacitor, wherein the fourth transistor is configured to be turned on in response to a third scan signal applied to the gate electrode;
a fifth transistor comprising: a first electrode directly connected to a reference voltage line for receiving a reference voltage; a second electrode coupled to the first terminal of the first capacitor; and a gate electrode, wherein the fifth transistor is configured to be turned on in response to the second scan signal applied to the gate electrode; and
a sixth transistor comprising: a first electrode for receiving a first voltage; a second electrode directly electrically connected to the gate electrode of the driving transistor; and a gate electrode, wherein the sixth transistor is configured to be turned on in response to a first scan signal applied to the gate electrode,
wherein the driving transistor and the second to sixth transistors are N-type transistors, and
wherein the second electrode of the driving transistor is directly connected to the light emitting device.

2. The pixel circuit of claim 1, wherein the sixth transistor is configured to apply the first voltage to the gate electrode of the driving transistor in response to the first scan signal applied to the gate electrode of the sixth transistor.

3. The pixel circuit of claim 2, wherein the fifth transistor is configured to apply the reference voltage to the first terminal of the first capacitor in response to the second scan signal applied to the gate electrode of the fifth transistor, and the second transistor is configured to diode-connect the driving transistor in response to the second scan signal applied to the gate electrode of the second transistor.

4. The pixel circuit of claim 3, wherein the second scan signal is a scan signal of an $n^{th}$ period.

5. The pixel circuit of claim 4, wherein the first scan signal and the second scan signal are both maintained at a transistor turn-on level during an overlap period, the transistor turn-on level being a voltage level configured to turn-on the second transistor when the voltage level is applied to the gate electrode of the second transistor.

6. The pixel circuit of claim 5, wherein the second scan signal is maintained at a high signal level for a duration greater than the overlap period.

7. The pixel circuit of claim 2, wherein the first scan signal is a scan signal of an $(n-2)^{th}$ period.

8. The pixel circuit of claim 1, wherein the fourth transistor transfers the data signal to the first terminal of the first capacitor in response to the third scan signal applied to the gate electrode of the fourth transistor.

9. The pixel circuit of claim 8, wherein the third scan signal is a scan signal of an $(n+3)^{th}$ period.

10. The pixel circuit of claim 1, wherein the light emitting device is an organic light emitting diode (OLED).

11. The pixel circuit of claim 1, wherein the driving transistor and the second to sixth transistors are N-type metal-oxide semiconductor field effect transistors (MOSFETs).

12. The pixel circuit of claim 1, wherein the first electrode of the driving transistor is a drain electrode and the second electrode of the driving transistor is a source electrode.

13. The pixel circuit of claim 1, wherein the first voltage applied to the first electrode of the sixth transistor is the first power supply voltage.

14. The pixel circuit of claim 1, wherein the first voltage applied to the first electrode of the sixth transistor is an initial voltage.

15. The pixel circuit of claim 1, wherein the first voltage applied to the first electrode of the sixth transistor is the reference voltage.

16. A method of driving a pixel circuit as recited in claim 1, the method comprising:
   initializing the gate electrode of the driving transistor when the sixth transistor is turned on in a first period;
   initializing the first terminal and the second terminal of the first capacitor when the sixth transistor and the fifth transistor are turned on in a second period;
   compensating for a threshold voltage of the driving transistor when the fifth transistor and the second transistor are turned on in a third period;
   applying the data signal when the fourth transistor is turned on in a fourth period; and
   applying the first power supply voltage to the driving transistor and generating a driving voltage so that the light emitting device may emit light when the third transistor is turned on in a fifth period.

17. An organic electro-luminescent display apparatus comprising:
   a scan driver for supplying a scan signal to a plurality of scan lines;
   an emission control driver for supplying an emission control signal to a plurality of emission control lines;
   a data driver for supplying a data signal to a plurality of data lines; and
   a plurality of pixel circuits located at crossing regions of the scan lines, the emission control lines and the data lines, wherein each pixel circuit of the plurality of pixel circuits comprises:
   an organic light emitting diode (OLED) comprising a first electrode and a second electrode;
   a driving transistor comprising: a first electrode; a second electrode; and a gate electrode, the driving transistor for outputting a driving current according to a voltage applied to the gate electrode of the driving transistor;
   a first capacitor comprising a first terminal and a second terminal coupled to the gate electrode of the driving transistor;
   a second capacitor comprising a first terminal coupled to the gate electrode of the driving transistor and a second terminal directly coupled to the first electrode of the OLED, the second capacitor being different from the first capacitor;
   a second transistor comprising: a first electrode coupled to the gate electrode of the driving transistor; a second electrode coupled to the first electrode of the driving transistor;
   and a gate electrode, wherein the second transistor is configured to be turned on in response to a second scan signal applied to the gate electrode;
   a third transistor for applying a first power supply voltage to the first electrode of the driving transistor in response to the emission control signal, the third transistor comprising a first electrode directly connected to a first power supply voltage line;
   a fourth transistor comprising: a first electrode coupled to the data signal, a second electrode coupled to the first terminal of the first capacitor; and a gate electrode, wherein the fourth transistor is configured to be turned on in response to a third scan signal applied to the gate electrode;
   a fifth transistor comprising: a first electrode directly connected to a reference voltage line coupled to a reference voltage; a second electrode coupled to the first terminal of the first capacitor; and a gate electrode, wherein the fifth transistor is configured to be turned on in response to the second scan signal applied to the gate electrode; and
   a sixth transistor comprising: a first electrode coupled to the first power supply voltage; a second electrode directly electrically connected to the gate electrode of the driving transistor; and a gate electrode, wherein the sixth transistor is configured to be turned on in response to a first scan signal applied to the gate electrode,
   wherein the driving transistor and the second to sixth transistors are N-type transistors, and
   wherein the second electrode of the driving transistor is directly connected to the light emitting device.

18. The organic electro-luminescent display apparatus of claim 17, wherein the gate electrode of the sixth transistor is coupled to an $(n-2)^{th}$ scan line of the scan lines and is configured to apply the first power supply voltage to the gate electrode of the driving transistor in response to the scan signal applied to the gate electrode of the sixth transistor.

19. The organic electro-luminescent display apparatus of claim 17, wherein the gate electrode of the fifth transistor is coupled to an $n^{th}$ scan line of the scan lines and is configured to apply the reference voltage to the first terminal of the first capacitor in response to the scan signal applied to the gate electrode of the fifth transistor.

20. The organic electro-luminescent display apparatus of claim 17, wherein the gate electrode of the second transistor is coupled to an $n^{th}$ scan line of the scan lines and is configured to diode-connect the driving transistor in response to the scan signal applied to the gate electrode of the second transistor.

21. The organic electro-luminescent display apparatus of claim 17, wherein the gate electrode of the fourth transistor is coupled to an $(n+3)^{th}$ scan line of the scan lines and is configured to transfer the data signal to the first terminal of the first capacitor in response to the scan signal applied to the gate electrode of the fourth transistor.

* * * * *